US009263900B2

(12) United States Patent
Ju et al.

(10) Patent No.: US 9,263,900 B2
(45) Date of Patent: Feb. 16, 2016

(54) BATTERY PACK INCLUDING A BATTERY MANAGEMENT SYSTEM CONFIGURED TO CONTROL CHARGING AND DISCHARGING THEREOF

(71) Applicant: SAMSUNG SDI CO., LTD., Yongin-si, Gyeonggi-do (KR)

(72) Inventors: Ri-A Ju, Yongin-si (KR); Hyun Kim, Yongin-si (KR); Suk-Kyum Kim, Yongin-si (KR); Seok-Gyun Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 312 days.

(21) Appl. No.: 13/773,525

(22) Filed: Feb. 21, 2013

(65) Prior Publication Data

US 2013/0249494 A1    Sep. 26, 2013

Related U.S. Application Data

(60) Provisional application No. 61/615,647, filed on Mar. 26, 2012.

(51) Int. Cl.
*H02J 7/00* (2006.01)
*B60L 3/00* (2006.01)
(Continued)

(52) U.S. Cl.
CPC ............. *H02J 7/0029* (2013.01); *B60L 3/0046* (2013.01); *B60L 3/0092* (2013.01); *B60L 3/04* (2013.01); *B60L 11/1816* (2013.01); *B60L 11/1859* (2013.01); *B60L 11/1861* (2013.01); *B60L 11/1862* (2013.01); *B60L 11/1866* (2013.01); *B60L 11/1868* (2013.01); *B60L 11/1872* (2013.01); *H02J 7/0031* (2013.01); *H02J 7/027* (2013.01); *H02J 7/044* (2013.01);
(Continued)

(58) Field of Classification Search
CPC ....... H02J 7/0088; H02J 7/009; H02J 7/0091; H02J 7/0093; H02J 7/04; H02J 7/042; H02J 7/047; H02J 7/048
USPC ......... 320/127, 128, 129, 130, 132, 134–136, 320/137, 150, 153
See application file for complete search history.

(56) References Cited

U.S. PATENT DOCUMENTS 3,281,640 A * 10/1966 Mas .............................. 320/147
3,763,416 A * 10/1973 Jache ........................... 320/147
(Continued)

FOREIGN PATENT DOCUMENTS

EP            0428 130 A2    5/1991
KR    10-2009-0013867 A    2/2009

OTHER PUBLICATIONS

EPO Search Report dated Jun. 5, 2013, for corresponding European Patent application 13153760.7, (6 pages).

*Primary Examiner* — Stacy Whitmore
(74) *Attorney, Agent, or Firm* — Lewis Roca Rothgerber Christie LLP (57) ABSTRACT

A battery pack including: a first terminal; a second terminal; a battery module coupled between the first terminal and the second terminal, the battery module having a state of charge; a sensor configured to measure a swelling of the battery module and to generate a swelling data value; and a battery management system configured to control a charging and a discharging of the battery module to reduce a swelling rate of the battery module or to correct the swelling of the battery module according to the swelling data value and the state of charge.

16 Claims, 7 Drawing Sheets

(51) Int. Cl.
  *B60L 3/04* (2006.01)
  *B60L 11/18* (2006.01)
  *H02J 7/02* (2006.01)
  *H02J 7/04* (2006.01)

(52) U.S. Cl.
  CPC ............... *H02J 7/047* (2013.01); *H02J 7/048* (2013.01); *B60L 2240/545* (2013.01); *H02J 7/009* (2013.01); *H02J 7/0088* (2013.01); *H02J 7/0091* (2013.01); *H02J 7/0093* (2013.01); *H02J 7/04* (2013.01); *H02J 7/042* (2013.01); *H02J 2007/004* (2013.01); *H02J 2007/0037* (2013.01); *Y02E 60/12* (2013.01); *Y02T 10/7005* (2013.01); *Y02T 10/7044* (2013.01); *Y02T 10/7061* (2013.01); *Y02T 10/7066* (2013.01); *Y02T 90/14* (2013.01)

(56) References Cited

U.S. PATENT DOCUMENTS

| | | | | |
|---|---|---|---|---|
| 5,115,183 A * | 5/1992 | Kyoukane et al. | | 320/123 |
| 5,701,068 A * | 12/1997 | Baer et al. | | 320/119 |
| 5,828,201 A * | 10/1998 | Hoffman et al. | | 320/104 |
| 6,037,751 A * | 3/2000 | Klang | | 320/160 |
| 6,154,011 A * | 11/2000 | Lam et al. | | 320/139 |
| 6,198,254 B1 * | 3/2001 | Satake et al. | | 320/132 |
| 6,246,216 B1 * | 6/2001 | Satake et al. | | 320/147 |
| 6,281,663 B1 | 8/2001 | Yagi et al. | | |
| 6,714,882 B1 * | 3/2004 | Iwaizono | | 702/63 |
| 7,830,125 B2 * | 11/2010 | Ibrahim | | 320/136 |
| 8,264,204 B2 * | 9/2012 | Nagaoka et al. | | 320/136 |
| 8,415,926 B2 * | 4/2013 | Bhardwaj et al. | | 320/134 |
| 8,513,919 B2 * | 8/2013 | Bhardwaj et al. | | 320/134 |
| 8,598,849 B2 * | 12/2013 | Bhardwaj et al. | | 320/134 |
| 8,854,012 B2 * | 10/2014 | Dai et al. | | 320/150 |
| 8,896,271 B2 * | 11/2014 | Kim et al. | | 320/136 |
| 8,952,823 B2 * | 2/2015 | Xie et al. | | 340/636.18 |
| 2004/0095109 A1 | 5/2004 | Kernahan | | |
| 2005/0113211 A1 * | 5/2005 | Surewaard et al. | | 477/92 |
| 2006/0093896 A1 | 5/2006 | Hong et al. | | |
| 2006/0132094 A1 * | 6/2006 | Koo | | 320/132 |
| 2006/0246345 A1 | 11/2006 | Yoon et al. | | |
| 2006/0267545 A1 * | 11/2006 | Lee et al. | | 320/106 |
| 2008/0315843 A1 * | 12/2008 | Bhardwaj | | 320/147 |
| 2009/0066291 A1 * | 3/2009 | Tien et al. | | 320/118 |
| 2009/0079397 A1 * | 3/2009 | Ibrahim | | 320/136 |
| 2010/0072953 A1 | 3/2010 | Mitsutani | | |
| 2010/0201326 A1 * | 8/2010 | Takami et al. | | 320/152 |
| 2010/0216004 A1 | 8/2010 | Yoon | | |
| 2010/0289451 A1 * | 11/2010 | Tuffner et al. | | 320/109 |
| 2010/0305820 A1 * | 12/2010 | McGee et al. | | 701/54 |
| 2011/0037430 A1 * | 2/2011 | Jang | | 320/109 |
| 2011/0089907 A1 * | 4/2011 | Bhardwaj et al. | | 320/136 |
| 2011/0115288 A1 * | 5/2011 | Lee | | 307/10.1 |
| 2011/0121787 A1 * | 5/2011 | Kim et al. | | 320/134 |
| 2011/0181246 A1 * | 7/2011 | Tae et al. | | 320/118 |
| 2011/0260691 A1 * | 10/2011 | Ishibashi et al. | | 320/134 |
| 2012/0021255 A1 * | 1/2012 | Kim | | 429/7 |
| 2012/0025771 A1 * | 2/2012 | Bhardwaj et al. | | 320/128 |
| 2012/0049803 A1 * | 3/2012 | Lee et al. | | 320/137 |
| 2012/0053768 A1 * | 3/2012 | Jeon | | 701/22 |
| 2012/0139487 A1 * | 6/2012 | Kim et al. | | 320/109 |
| 2012/0187920 A1 * | 7/2012 | Zhong | | 320/139 |
| 2012/0276427 A1 * | 11/2012 | Kim | | 429/90 |
| 2012/0313573 A1 * | 12/2012 | Lim et al. | | 320/107 |
| 2013/0026993 A1 * | 1/2013 | Hintz et al. | | 320/119 |
| 2013/0038271 A1 * | 2/2013 | Park | | 320/104 |
| 2013/0049702 A1 * | 2/2013 | Dai et al. | | 320/150 |
| 2013/0241494 A1 * | 9/2013 | Bhardwaj et al. | | 320/129 |
| 2013/0249219 A1 * | 9/2013 | Kim et al. | | 290/36 R |
| 2013/0249488 A1 * | 9/2013 | Ju et al. | | 320/112 |
| 2013/0249492 A1 * | 9/2013 | Kim et al. | | 320/128 |
| 2013/0249493 A1 * | 9/2013 | Kim et al. | | 320/134 |
| 2013/0249494 A1 * | 9/2013 | Ju et al. | | 320/134 |
| 2013/0278218 A1 * | 10/2013 | Onnerud et al. | | 320/118 |
| 2013/0341923 A1 * | 12/2013 | Ju et al. | | 290/48 |
| 2014/0001843 A1 * | 1/2014 | Lee | | 307/10.1 |

* cited by examiner

BATTERY PACK INCLUDING A BATTERY MANAGEMENT SYSTEM CONFIGURED TO CONTROL CHARGING AND DISCHARGING THEREOF

CROSS-REFERENCE TO RELATED APPLICATION

This application claims priority to and the benefit of U.S. Provisional Application No. 61/615,647, filed on Mar. 26, 2012, in the U.S. Patent and Trademark Office, the entire content of which is incorporated herein by reference.

BACKGROUND

1. Field

One or more embodiments of the present invention relate to a battery pack.

2. Description of Related Art

In general, unlike primary batteries, secondary batteries are rechargeable. According to the types of external devices to which the secondary batteries are applied, the secondary batteries may be used as a single battery or in a battery module in which a plurality of batteries are coupled as a unit.

According to the conventional art, a lead storage battery is used as a power supply for starting up an engine. Recently, an Idle Stop & Go (ISG) system has been applied to engines to improve fuel efficiency, and the use of the ISG system is gradually increasing. A power supply that supports an ISG system, which is an idling limiting device, should maintain strong charging and discharging characteristics despite high output demands for engine start up and frequent start ups, and should have a long life span. Charging and discharging characteristics of lead storage batteries, however, deteriorate due to repeated engine stops or restarts under the ISG system, and accordingly, have a short life span.

SUMMARY

Aspects of embodiments of the present invention provide for a battery pack including: a first terminal; a second terminal; a battery module coupled between the first terminal and the second terminal, the battery module having a state of charge; a sensor configured to measure a swelling of the battery module and to generate a swelling data value; and a battery management system configured to control a charging and a discharging of the battery module to reduce a swelling rate of the battery module or to correct the swelling of the battery module according to the swelling data value and the state of charge.

The battery management system may be configured to control the charging and the discharging of the battery module in between charging and discharging state of charge limits.

According to an embodiment of the present invention, the battery pack further includes a selector coupled between the first terminal and the battery module, the selector including: plurality of input terminals; an output terminal coupled to the first terminal; and a switch configured to selectively couple the plurality of input terminals to the output terminal according to a switch control signal. The battery management system may be configured to generate the switch control signal such that one of the plurality of input terminals coupled to the battery module is not coupled to the output terminal when the swelling data value is greater than or equal to a reference battery swelling value and the state of charge has reached a limit.

The battery pack may further include: a selector coupled between the first terminal and the battery module, the selector including: plurality of input terminals; an output terminal coupled to the first terminal; and a switch configured to selectively couple the plurality of input terminals to the output terminal according to a switch control signal generated by the battery management system; and an auxiliary battery module coupled between the selector and the second terminal. Here, the plurality of input terminals may include: a first input terminal coupled to the battery module; a second input terminal coupled to the auxiliary battery module; and a third input terminal not coupled to either of the battery module or the auxiliary battery module, and the switch may be configured to selectively couple the output terminal to at least one from among the first input terminal, the second input terminal, and the third input terminal according to the switch control signal.

The battery management system may be configured to generate the switch control signal such that the second input terminal is coupled to the output terminal when the swelling data value is greater than or equal to a reference battery swelling value and the state of charge has reached a limit.

The selector may further include: a first variable resistor coupled between the first input terminal and a parallel connection terminal; and a second variable resistor coupled between the second input terminal and the parallel connection terminal, with the switch configured to selectively couple the output terminal to one from among the parallel connection terminal and the third input terminal according to the switch control signal, and the battery management system configured to control the first variable resistor and the second variable resistor according to the swelling data value and the state of charge to adjust a ratio between a charging or discharging current flowing into or out of the battery module and a charging or discharging current flowing into or out of the auxiliary battery module.

The battery management system may be configured to charge and discharge the battery module, repeatedly, when the swelling data value is greater than or equal to a reference battery swelling value and the state of charge has reached a limit.

In an embodiment of the present invention, an electrical load is coupled between the first terminal and the second terminal, and the battery management system is configured to discharge the battery module through the electrical load when the swelling data value is greater than or equal to the reference battery swelling value and the state of charge has reached the limit.

The battery management system may further include: a swelling sensor configured to receive the swelling data value to determine whether a degree of swelling is greater than or equal to a swelling reference value; a range limiter configured to limit the state of charge of the battery module to be within a range between a charging limit and a discharging limit; and a corrector configured to discharge the battery when the state of charge is greater than or equal to the charging limit and to charge the battery when the state of charge is less than or equal to the discharging limit.

According to another aspect of the present invention, a method for operating a battery pack including a battery module is provided, the method including: sensing whether or not the battery module is swollen; monitoring a state of charge of the battery module; determining whether a state of the battery module is a charging state or a discharging state; when the state of the battery module is the charging state, determining whether or not the state of charge is greater than or equal to a charging limit; when the state of the battery module is the discharging state, determining whether or not the state of charge is less than or equal to a discharging limit; and controlling the charging and discharging of the battery module according to at least one of the state of the battery module, the state of charge of the battery module, or whether or not the battery module is swollen.

The method may further include charging or discharging the battery module within a state of charge range, which is between the charging limit and the discharging limit.

The battery pack may further include a sensor to measure a battery swelling measurement value of the battery module, and the method may further include: when the battery module is swollen and the state of charge is greater than or equal to the charging limit or lesser than or equal to a discharging limit, disconnecting the battery module from an external device to stop the charging or the discharging of the battery module, the battery module may be sensed to be swollen when the battery swelling measurement value is greater than or equal to a reference battery swelling value.

The battery pack may further include an auxiliary battery module, and the method may further include: when the battery module is disconnected from the external device to stop the charging of the battery module, connecting the auxiliary battery module to the external device to start the charging of the auxiliary battery module; and when the battery module is disconnected from the external device to stop the discharging of the battery module, connecting the auxiliary battery module to the external device to start the discharging of the auxiliary battery module.

In an embodiment of the present invention, the battery pack further includes a sensor to measure a battery swelling measurement value of the battery module, and an auxiliary battery module, and the method further includes: measuring the battery swelling measurement value; when the state of the battery module is the charging state, adjusting a ratio between a charging current provided to the battery module and a charging current provided to the auxiliary battery module according to the state of charge of the battery module and the battery swelling measurement value; and when the state of the battery module is the discharging state, adjusting a ratio between a discharging current provided from the battery module and a discharging current provided from the auxiliary battery module according to the state of charge of the battery module and the battery swelling measurement value.

According to an embodiment of the present invention, when the state of the battery module is the charging state, begin discharging the battery module when the battery module is swollen and the state of charge is greater than or equal to the charging limit; and when the state of the battery module is the discharging state, begin charging the battery module when the battery module is swollen and the state of charge is less than or equal to the discharging limit.

According to another aspect of the present invention, there is provided an idle stop and go system for a vehicle including: a positive bus; a negative bus; a power generation module coupled between the positive bus and the negative bus; a starter motor coupled between the positive bus and the negative bus; an electrical load coupled between the positive bus and the negative bus; a main controller configured to generate a main control signal; and a battery pack including: a first terminal coupled to the positive bus; a second terminal coupled to the negative bus; a battery module coupled between the first terminal and the second terminal and having a state of charge; a sensor configured to measure a swelling of the battery module and to generate a swelling data value; and a battery management system configured to receive the main control signal, and to control a charging and a discharging of the battery module to reduce a swelling rate of the battery module or to correct the swelling of the battery module according to at least one of the swelling data value, the state of charge, or the main control signal.

The battery pack may further include: a selector coupled between the first terminal and the battery module, the selector including: a plurality of input terminals; an output terminal coupled to the first terminal; and switch configured to selectively couple the plurality of input terminals to the output terminal according to a switch control signal generated by the battery management system; and an auxiliary battery module coupled between the selector and the second terminal, where the plurality of input terminals may include: a first input terminal coupled to the battery module; a second input terminal coupled to the auxiliary battery module; and a third input terminal not coupled to either of the battery module or the auxiliary battery module, and the switch may be configured to selectively couple the output terminal to at least one from among the first input terminal, the second input terminal, and the third input terminal according to the switch control signal.

The selector may further include: a first variable resistor coupled between the first input terminal and a parallel connection terminal; and a second variable resistor coupled between the second input terminal and the parallel connection terminal, and the switch may be configured to selectively couple the output terminal to one from among the parallel connection terminal and the third input terminal according to the switch control signal.

The battery management system may be configured to charge and discharge the battery module, repeatedly, when the swelling data value is greater than or equal to a reference battery swelling value and the state of charge has reached a limit.

The battery management system may be configured to discharge the battery module through the electrical load when the swelling data value is greater than or equal to the reference battery swelling value and the state of charge has reached the limit.

BRIEF DESCRIPTION OF THE DRAWINGS

The above and other features and aspects of the present invention will become more apparent by describing in detail embodiments thereof with reference to the attached drawings in which.

DETAILED DESCRIPTION

Hereinafter, certain embodiments of the present invention are described more fully with reference to the accompanying drawings. The embodiments will be described in detail such that one of ordinary skill in the art may easily make and use the present invention. It should be understood that the embodiments of the present invention may vary but do not have to be mutually exclusive. For example, particular shapes, structures, and properties according to an embodiment described in this specification may be modified in other embodiments without departing from the spirit and scope of the prevent invention. In addition, positions or arrangement of individual components of each of the embodiments may also be modified without departing from the spirit and scope of the present invention. Accordingly, the detailed description below should not be construed as having limited meanings but construed to encompass the scope of the claims and any equivalent ranges thereto. In the drawings, like reference numerals denote like elements in various aspects.

Hereinafter, when an element is described as being coupled (e.g., electrically coupled or connected) to another element, that element may be directly coupled to the another element or may be indirectly coupled to the another element with one or more intervening elements interposed therebetween. Further, some of the elements that are not essential to the complete understanding of the invention may be omitted for clarity.

Figure 1:
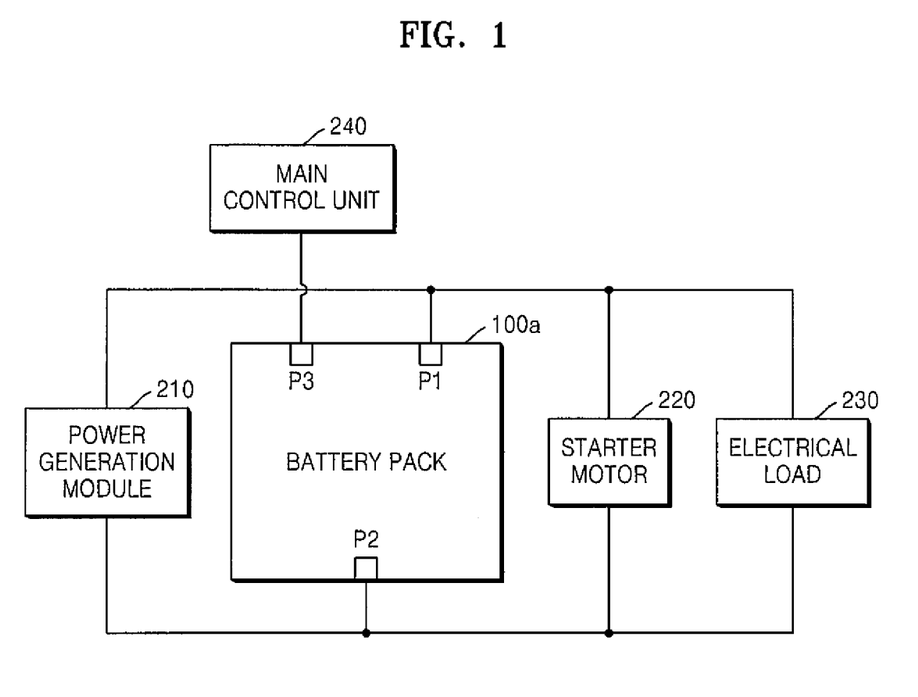
FIG. 1 is a diagram of a vehicle including a battery pack according to an embodiment of the present invention.

FIG. 1 is a diagram illustrating a vehicle including a battery pack 100a according to an embodiment of the present invention.

The battery pack 100a may be electrically coupled in parallel to a power generation module 210 and a starter motor 220 via first and second terminals P1 and P2. Hereinafter, the first terminal P1 may be referred to as an external device connection terminal.

In detail, the battery pack 100a may store charging power generated from the power generation module 210 and supply discharging power to the starter motor 220. For example, the power generation module 210 may be coupled to an engine (not shown) to provide power thereto, and may be coupled to a driving axis of the engine to convert rotational motive power into an electrical output. Here, charging power generated by the power generation module 210 may be stored in a battery module 110, as described below, via the first and second terminals P1 and P2 of the battery pack 100a. For example, the power generation module 210 may include a direct current (DC) generator (not shown), or may include an alternating current (AC) generator (not shown) and a rectifying unit (not shown), and may supply power of about 15 V DC, e.g., a voltage from about 14.6 V to about 14.8 V DC (or any other suitable voltage according to the system's characteristics).

According to an embodiment of the present invention, the battery pack 100a may be used as a power unit for starting up an engine of an Idle Stop & Go (ISG) system, in which an ISG function is implemented to improve fuel efficiency. In the ISG system, as the engine is repeatedly and frequently stopped and restarted, charging and discharging of the battery pack 100a are repeated.

A lead storage battery used with an ISG system may experience a decrease in durability, a decrease in life span, and a decrease in charging and discharging characteristics due to frequent repetition of charging and discharging operations. Also, a charging capacity may be decreased due to repeated charging or discharging. Thus, a starting up ability of an engine may be degraded, and an exchange cycle of the lead storage battery may be shortened.

Compared to the lead storage battery, the battery module 110 according to an embodiment of the present invention includes a lithium ion battery, which maintains relatively uniform charging and discharging characteristics, and thus, has little deterioration and may be suitable for an ISG system where stopping and re-starting of an engine is repeated. Also, compared to a lead storage battery of the same charging capacity, the battery module 110 according to an embodiment of the present invention has the same charging capacity with less volume than the lead storage battery, and thus, a mounting space may be reduced. While the preceding embodiment describes the use of a lithium ion battery, the present invention is not limited thereto, and for example, a nickel metal hydride (NiMH) battery may be used as the battery module 110 according to embodiments of the present invention.

According to an embodiment of the present invention, when swelling of a battery is sensed, the battery pack 100a may limit a state-of-charge (SOC) to be within a suitable (e.g., predetermined) charging or discharging range to reduce a swelling rate (or swelling proceeding speed), or may conduct charging or discharging repeatedly within the charging or discharging range, thereby correcting the swelling. An internal structure and operation of the battery pack 100a will be described in detail below.

A main controller (e.g., a main control unit) 240 may control the overall operation of the vehicle in which the battery pack 100a may be mounted. The main controller 240 may be coupled to the battery pack 100a via a third terminal P3 to exchange a control signal with the battery pack 100a, monitor a state of the battery pack 100a, and control an operation of the battery pack 100a.

The power generation module 210 may refer to an apparatus including an alternator of a vehicle. An alternator not only may supply charging power to the battery pack 100a, but may also supply power to an electrical load 230 while an engine is driven.

The starter motor 220 may be driven when an engine of a vehicle is started up, and may provide an initial rotational motive power that rotates a driving axis of the engine. For example, the starter motor 220 may receive stored power via the first and second terminals P1 and P2 of the battery pack 100a and may rotate the driving axis of the engine when the engine is started up or when the engine is restarted after an idle stop, thereby re-starting the engine. Furthermore, in the present invention, the starter motor 220 may be driven by driving signal from BMS 120, as described below.

Together with the power generation module 210 and the starter motor 220, the electrical load 230 may be coupled to the battery pack 100a. The electrical load 230 may consume power stored in the battery pack 100a, may receive stored discharging power via the first and second terminals P1 and P2, and may include various components for electrical devices.

Figure 2:
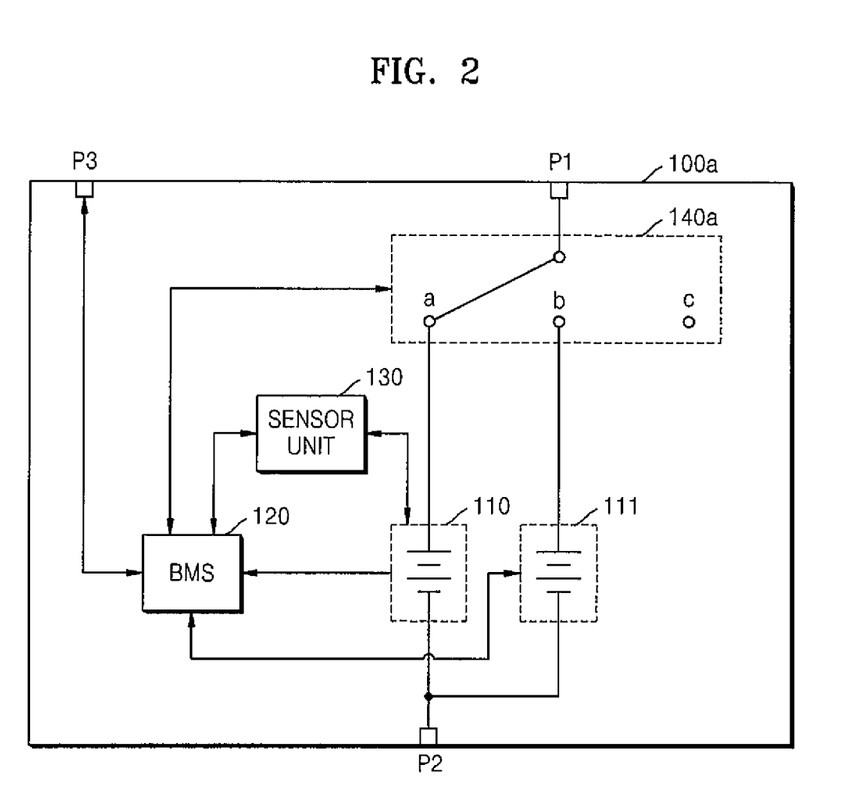
FIG. 2 is a diagram of a battery pack according to an embodiment of the present invention.

FIG. 2 illustrates a battery pack 100a according to an embodiment of the present invention.

Referring to FIG. 2, the battery pack 100a may include the battery module 110, an auxiliary battery 111, a battery management system (BMS) 120, a sensor (e.g., a sensor unit) 130, and a selector (e.g., a selection unit) 140a.

The battery module 110 and the auxiliary battery 111 may each include a plurality of battery cells (not shown) that may be coupled serially or in parallel. The battery module 110 according to an embodiment of the present invention is coupled between the first and second terminals P1 and P2, and receives a charging power and outputs a discharging power.

The battery module 110 may include a plurality of battery sub-units. For example, when the battery pack 100a includes a battery rack including a plurality of battery trays, the battery rack may be regarded as the battery module 110. Also, when a battery tray includes a plurality of battery cells, the battery tray may be regarded as the battery module 110.

As described above, the battery module 110 may include a lithium ion battery, a nickel-hydrogen battery, etc. The auxiliary battery 111 may include a conventional lead storage battery in order to complement characteristics of the battery module 110.

As the battery module 110 repeats charging and discharging, the battery module 110 may become overcharged or subjected to a high temperature, which may cause battery swelling, i.e., expansion of battery cells in the battery module 110 due to an increase in an internal pressure. In particular, when the battery module 110 includes a lithium ion battery, battery swelling may deform an external appearance of a case of the battery pack 100a, and stability of the battery pack 100a may be problematic due to this deformation.

The speed or rate of battery swelling may increase when overcharging or over discharging of the battery is repeated. According to an embodiment of the present invention, a state of charge (SOC) of a battery is limited to within a suitable (e.g., predetermined) charging and discharging range to thereby reduce a rate (or proceeding speed) of swelling of the battery module 110. Also, according to another embodiment of the present invention, in order to actively correct the swelling, charging and discharging of the battery module 110 may be repeatedly conducted within a charging or discharging range.

To reduce the battery swelling rate (or proceeding speed) or to correct the swelling, the BMS 120 may control a charging and discharging process of the battery module 110.

The BMS 120 may be coupled to the battery module 110, and may control charging and discharging operations of the battery module 110. In addition, the BMS 120 may perform functions such as an overcharge protection function, an over-discharging protection function, an over-current protection function, an over-voltage protection function, an overheating protection function, and/or cell balancing. To this end, the BMS 120 may include a measuring unit that measures a voltage, a current, a temperature, a remaining amount of power, a lifespan, a SOC, or the like from the battery module 110, and may generate a control signal based on a measurement result to control external devices such as the starter motor 220 and the power generation module 210 of embodiments of the present invention.

The internal structure and functions of elements of the BMS 120 according to an embodiment of the present invention will be described with reference to FIG. 3 below with other elements of the battery pack 100a.

The sensor unit 130 measures a degree of swelling of the battery module 110. According to an embodiment of the present invention, the sensor unit 130 may measure a degree of swelling of the battery module 110 by using a piezoelectric element. When using a piezoelectric element, a minute change in the battery module 110 may be precisely measured. The sensor unit 130 transmits a measurement result to the BMS 120.

The selector 140a may selectively couple a circuit between P1 and terminals (a), (b) or (c) according to a control signal of the BMS 120. The selector 140a may include a switching device. The selector 140a may connect the switching device to terminal (a) to couple a first terminal P1, which is a connection terminal, to an external device, to the battery module 110, or may connect the switching device to terminal (b) to couple the same to the auxiliary battery 111, or may connect the switching device to terminal (c) so that the switching device is not coupled to any of devices in the battery pack 100a.

Hereinafter, an internal structure of the BMS 120 and a method in which the BMS 120 reduces a rate (or proceeding speed) of swelling of the battery module 110 and corrects the swelling will be described.

Figure 3:
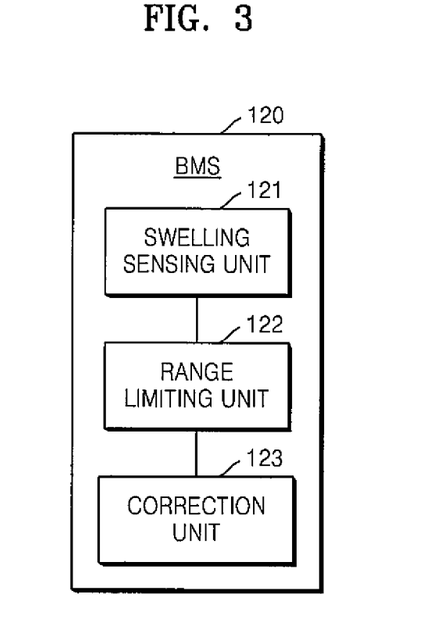
FIG. 3 is a diagram of a battery management system (BMS) according to an embodiment of the present invention.

FIG. 3 illustrates the BMS 120 according to an embodiment of the present invention.

Referring to FIG. 3, the BMS 120 includes a swelling sensor (e.g., a swelling sensing unit) 121, a range limiter (e.g., a range limiting unit) 122, and a corrector (e.g., a correcting unit) 123. The swelling sensor 121 receives a battery swelling measurement value from the sensor unit 130 to determine whether or not the degree of swelling exceeds a reference value. For example, if a degree of swelling of the battery module 110 measured by using a piezoelectric element of the sensor unit 130 is equal to or greater than a reference value (e.g., a predetermined reference value), the swelling sensor 121 may determine that the battery module 110 is swollen and a decrease in the swelling speed or correction of the swelling may be required.

The range limiter 122 limits a SOC of the battery module 110 to be within a charging and discharging range, which is between a charging limit and a discharging limit, to thereby reduce rate (or a proceeding speed) of swelling, according to an embodiment of the present invention.

Referring to FIG. 2 again, when performing charging and discharging, the range limiter 122 may examine whether a SOC of the battery module 110 is at a discharging limit or at a charging limit. If the SOC of the battery module 110 is at a discharging limit, the switching device may be controlled to select terminal (b) so that an external device may receive power from the auxiliary battery 111 or supply power to the auxiliary battery 111.

In another embodiment of the present invention, if the SOC of battery module 110 reaches a discharging limit or a charging limit, the range limiter 122 connects the switching device to terminal (c) to block a connection between the external device and the battery pack 100a.

Figure 4:
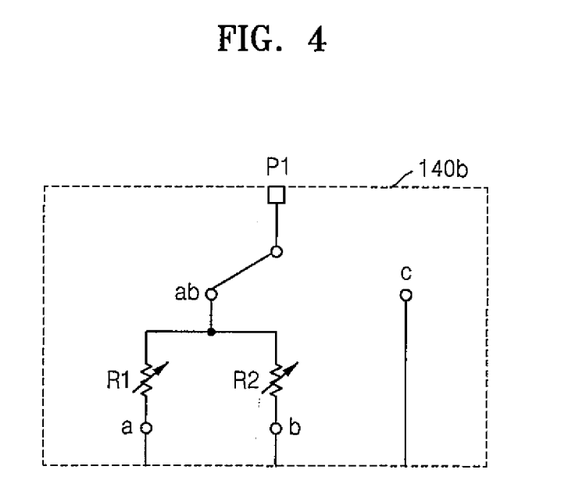
FIG. 4 is a diagram of a selector according to another embodiment of the present invention.

FIG. 4 is a diagram illustrating a selector 140b according to another embodiment of the present invention.

Referring to FIG. 4, in the selector 140b, a battery module connection terminal (a) and an auxiliary battery connection terminal (b) are respectively coupled to variable resistors R1 and R2 so as to be coupled to a parallel connection terminal (ab). When the selector 140b of FIG. 4 is included in the battery pack 100a, the range limiter 122 adjusts an amount of current flowing into the battery module 110 and the auxiliary battery 111 via the variable resistors R1 and R2, thereby controlling a charging and discharging range.

That is, when a SOC of the battery module 110 is close to a charging limit or a discharging limit, the range limiter 122 may connect a switching device to terminal (ab), and may set a resistance of the variable resistor R1 to be greater than that of the variable resistor R2 so that more discharging or charging current flows to the auxiliary battery 111 than to the battery module 110.

A process of decreasing a swelling rate (or proceeding speed) using the range limiter 122 will be further described with reference to FIGS. 5 and 6 below.

Figure 5:
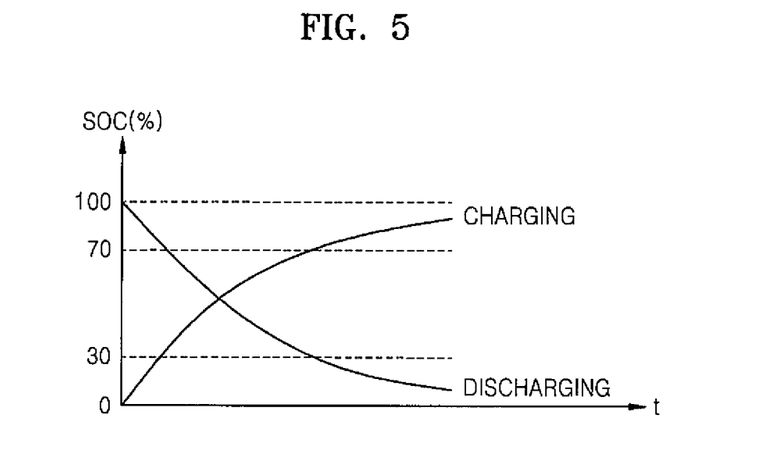
FIG. 5 is a graph of a state-of-charge (SOC) of a battery.

FIG. 5 is a graph of a SOC of a battery.

In order to prevent complete charging or complete discharging of a battery (i.e., where a SOC of the battery is 100% or 0%) as shown in FIG. 5, the BMS 120 according to an embodiment of the present invention may set a charging limit or a discharging limit. For example, the charging limit may be 70% of a SOC maximum, and the discharging limit may be 30% of a SOC maximum.

Figure 6:
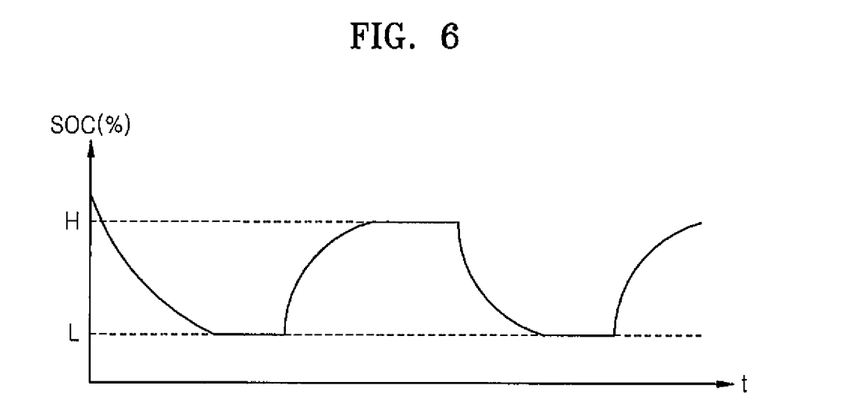
FIG. 6 is a graph illustrating charging or discharging of a battery module by limiting a range of charging or discharging, according to an embodiment of the present invention.

FIG. 6 is a graph illustrating charging or discharging of a battery module by limiting a range of charging or discharging, according to an embodiment of the present invention.

The range limiter 122 may control the battery pack 100a such that when a SOC reaches a discharging limit L, and while the battery module 110 is being discharged to the electrical load 230, as illustrated in FIG. 6, discharging of the battery module 110 is stopped. Likewise, while charging the battery module 110, and when a SOC reaches the charging limit H, no more power may be supplied from the power generation module 210 to the battery module 110.

Figure 7:
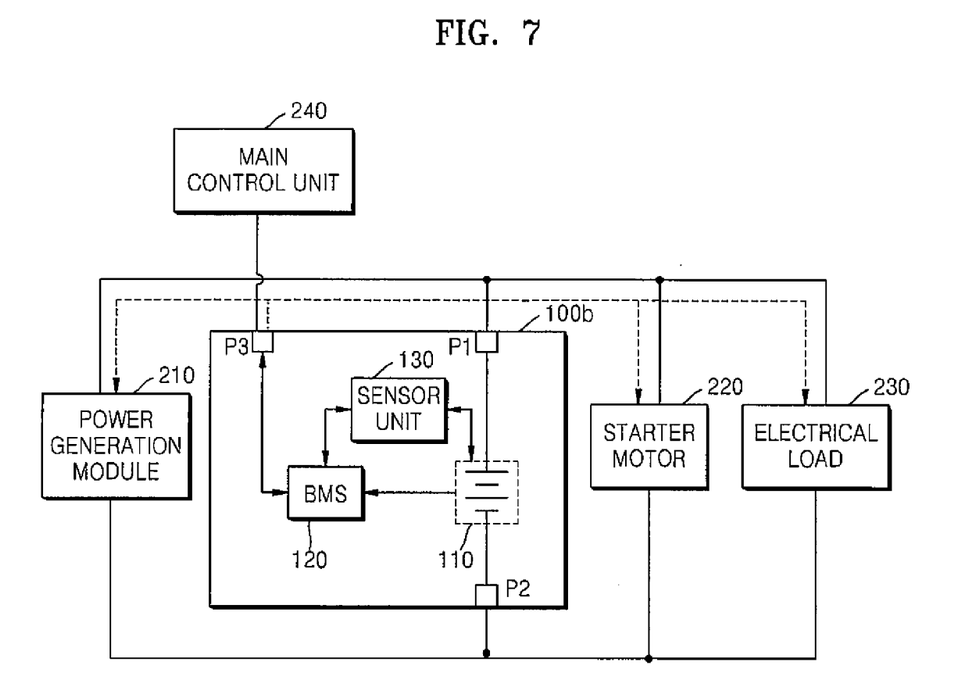
FIG. 7 is a diagram of a vehicle including a battery pack according to another embodiment of the present invention.

FIG. 7 illustrates a vehicle including a battery pack 100b according to another embodiment of the present invention.

The BMS 120 may not only limit a SOC of a battery to be within a charging or discharging range, but charging or discharging may also be actively performed to correct swelling. That is, the SOC of the battery may be limited when charging or discharging a battery via the electrical load 230 or the power generation module 210, and a swollen battery may be actively corrected by repeated charging and discharging even when a vehicle is not driven.

Referring to FIG. 7, the BMS 120 of the battery pack 100b may transmit a signal to the power generation module 210, the starter motor 220, and/or the electrical load 230 via a P3 terminal.

According to an embodiment of the present invention, when swelling of the battery module 110 is sensed after the engine of the vehicle is stopped, the corrector 123 of the BMS 120 transmits a signal for driving the starter motor 220. That is, even if the user does not start up the engine of the vehicle, the starter motor 220 may be driven by a driving signal of the BMS 120, and when the engine is started by the starter motor 220, the power generation module 210 supplies charging power to the battery module 110. Accordingly, charging of the battery module 110 is performed.

When the battery module 110 is charged to reach a charging limit, the corrector 123 may stop operation of the power generation module 210 and drive the electrical load 230 to discharge the battery module 110. That is, even when the engine is stopped, the BMS 120 may forcibly operate the electrical load 230, which may be, for example, a light, a radio, a fan, an air conditioner, etc., thereby discharging the battery module 110.

When the battery module 110 is discharged to reach a discharging limit, the BMS 120 may transmit a signal for stopping operation of the electrical load 230, and may transmit a signal for driving the starter motor 220 so that the power generation module 210 supplies charging power to the battery module 110.

Charging or discharging of the battery module 110 may be repeated within a charging or discharging range in the above-described manner to thereby correct swelling of the battery module 110. If the sensing unit 130 determines that swelling of the battery module 110 is corrected, the BMS 120 may stop charging or discharging of the battery module 110.

Figure 8:
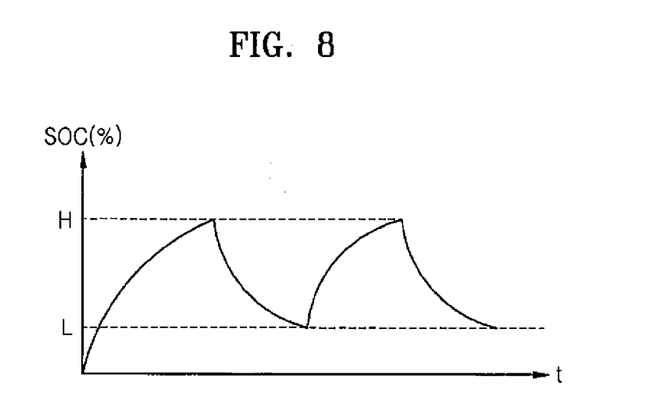
FIG. 8 is a graph illustrating a SOC of a battery when swelling is corrected, according to an embodiment of the present invention.

FIG. 8 is a graph illustrating a SOC of a battery when swelling is corrected, according to an embodiment of the present invention.

As illustrated in FIG. 8, the corrector 123 may charge the battery module 110 and, when a SOC reaches a charging limit H, the battery module 110 may be discharged (e.g., immediately discharged). On the other hand, when a SOC reaches a discharging limit L, and while discharging the battery module 110, the battery module 110 may be charged (e.g., immediately charged).

According to the above-described method, the corrector 123 may actively correct swelling of the battery module 110.

Figure 9:
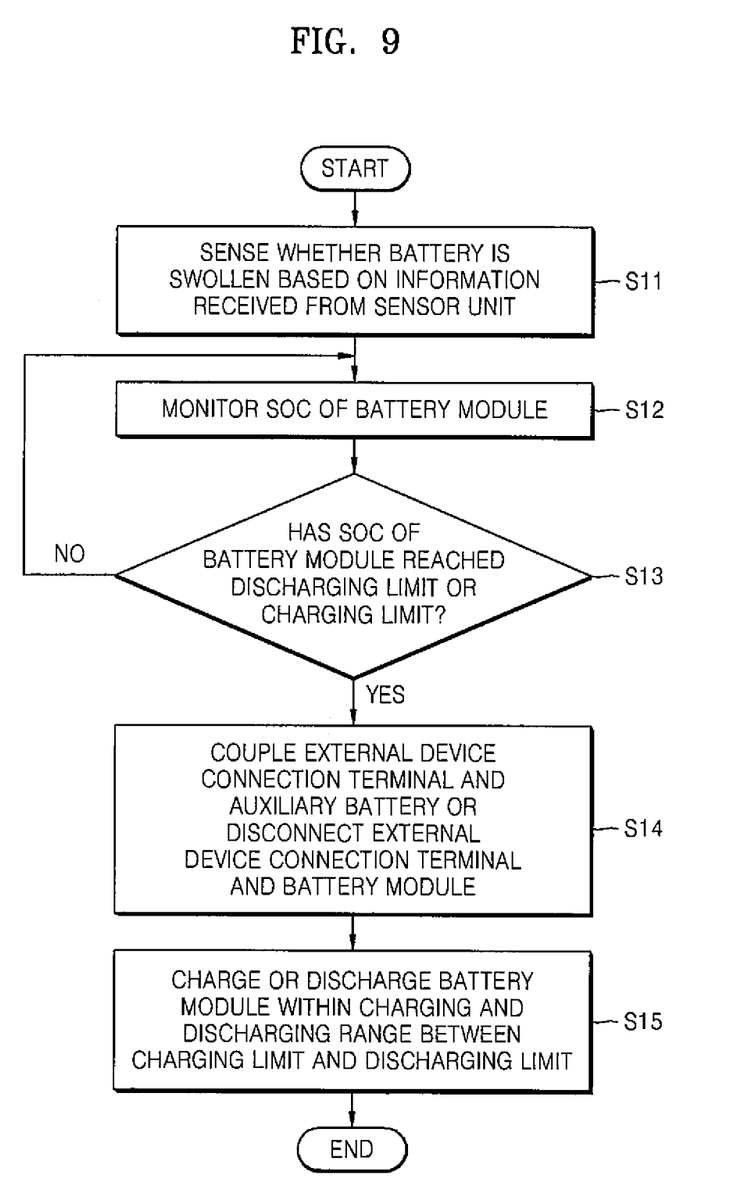
FIG. 9 is a flowchart illustrating an operation of reducing a rate of swelling by limiting a charging or discharging range of a SOC of a battery.

FIG. 9 is a flowchart illustrating an operation of reducing a rate of swelling by limiting a charging or discharging range of a SOC of a battery.

First, in operation S11, a BMS 120 senses whether or not a battery is swollen, for example, by using information received from a sensor unit 130.

Next, in operation S12, the BMS 120 monitors a SOC of a battery module 110 to sense a moment when the SOC of the battery module 110 reaches a discharging limit or a charging limit. In operation S13, the BMS 120 determines whether the SOC of the battery module 110 reaches a discharging limit or a charging limit.

If the SOC of the battery module 110 has reached a discharging limit or a charging limit in operation S14, a selector 140 couples an external device connection terminal, for example, a terminal P1, to an auxiliary battery 111. Alternatively, the selector 140 may disconnect an external device connection terminal and the battery module 110.

If the SOC of the battery module 110 has not reached the discharging limit or the charging limit, the SOC of the battery module 110 is further sensed.

Finally, in operation S15, the battery module 110 is charged or discharged within a charging and discharging range between the charging limit and the discharging limit.

Figure 10:
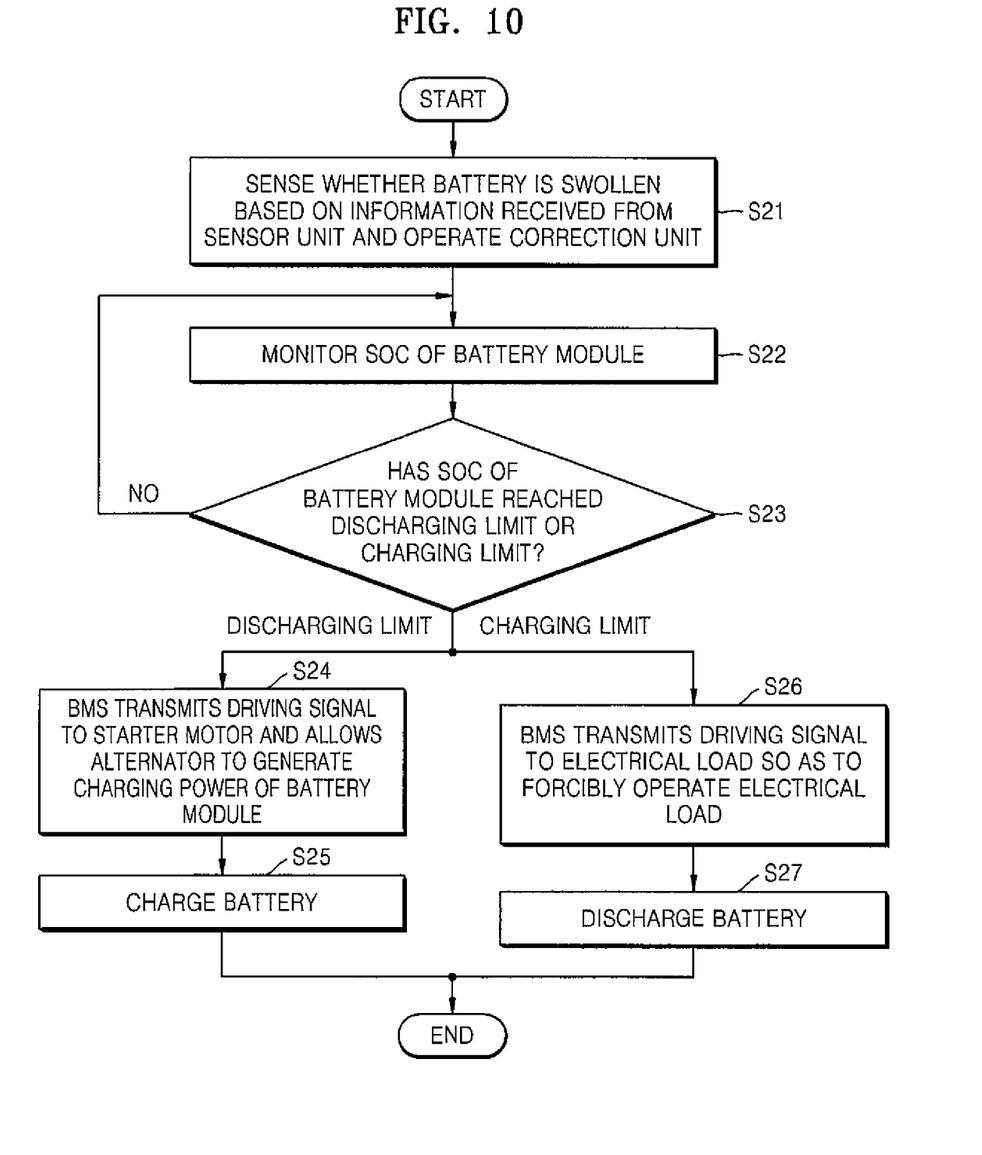
FIG. 10 is a flowchart illustrating an operation of correcting swelling by charging or discharging a battery within a charging or discharging range.

FIG. 10 is a flowchart illustrating an operation of correcting swelling by charging or discharging a battery within a charging or discharging range.

In operation S21, when the engine of a vehicle is stopped, a BMS 120 senses whether a battery is swollen by using information received from a sensor unit 130, and operates a corrector 123.

Next, in operation S22, the BMS 120 monitors a SOC of a battery module 110 to sense a moment when a SOC reaches a discharging limit or a charging limit. In operation S23, the BMS 120 determines whether the SOC of the battery module 110 reaches a discharging limit or a charging limit.

When the SOC of the battery module 110 reaches a discharging limit, operation S24 is performed where the BMS 120 transmits a driving signal to a starter motor 220 and allows an alternator to generate charging power of the battery module 110 so that, in operation S25, the battery module 110 may be charged.

When the SOC of the battery module 110 reaches a charging limit, operation S26 is performed where the BMS 120 transmits a driving signal to an electrical load 230 so as to forcibly operate the electrical load 230 so that, in operation S27, the battery module 110 may be discharged.

If swelling is not corrected, charging or discharging of the battery may repeat.

While this invention has been particularly shown and described with reference to exemplary embodiments thereof, it will be understood by those of ordinary skill in the art that various changes in form and details may be made therein without departing from the spirit and scope of the invention as defined by the appended claims and equivalents thereof.

LISTING OF SOME REFERENCE NUMERALS

100: battery pack
110: battery module
120: BMS
121: swelling sensor

122: range limiter
123: corrector
130: sensor unit
140: selector
150: variable resistor
210: power generation module
220: starter motor
230: electrical load

What is claimed is:

1. A battery pack comprising:
a first terminal;
a second terminal;
a battery module coupled between the first terminal and the second terminal, the battery module having a state of charge;
a sensor configured to measure a swelling of the battery module and to generate a swelling data value; and
a battery management system configured to control a charging and a discharging of the battery module to reduce a swelling rate of the battery module or to correct the swelling of the battery module according to the swelling data value and the state of charge,
wherein the battery management system further comprises:
a swelling sensor configured to receive the swelling data value to determine whether a degree of swelling is greater than or equal to a swelling reference value;
a range limiter configured to limit the state of charge of the battery module to be within a range between a charging limit and a discharging limit to reduce a swelling rate of the battery module, when the swelling data value is greater than or equal to the swelling reference value; and
a corrector configured to discharge the battery module when the state of charge is greater than or equal to the charging limit and to charge the battery module when the state of charge is less than or equal to the discharging limit, repeatedly, to correct the swelling of the battery module, when the swelling data value is greater than or equal to the swelling reference value.

2. The battery pack of claim 1, further comprising a selector coupled between the first terminal and the battery module, the selector comprising:
a plurality of input terminals;
an output terminal coupled to the first terminal; and
a switch configured to selectively couple the plurality of input terminals to the output terminal according to a switch control signal, and
wherein the battery management system is configured to generate the switch control signal such that one of the plurality of input terminals coupled to the battery module is not coupled to the output terminal when the swelling data value is greater than or equal to a reference battery swelling value and the state of charge has reached a limit.

3. The battery pack of claim 1, further comprising:
a selector coupled between the first terminal and the battery module, the selector comprising:
a plurality of input terminals;
an output terminal coupled to the first terminal; and
a switch configured to selectively couple the plurality of input terminals to the output terminal according to a switch control signal generated by the battery management system; and
an auxiliary battery module coupled between the selector and the second terminal,
wherein the plurality of input terminals comprises:
a first input terminal coupled to the battery module;
a second input terminal coupled to the auxiliary battery module; and
a third input terminal not coupled to either of the battery module or the auxiliary battery module, and
wherein the switch is configured to selectively couple the output terminal to at least one from among the first input terminal, the second input terminal, and the third input terminal according to the switch control signal.

4. The battery pack of claim 3,
wherein the battery management system is configured to generate the switch control signal such that the second input terminal is coupled to the output terminal when the swelling data value is greater than or equal to a reference battery swelling value and the state of charge has reached a limit.

5. The battery pack of claim 3,
wherein the selector further comprises:
a first variable resistor coupled between the first input terminal and a parallel connection terminal; and
a second variable resistor coupled between the second input terminal and the parallel connection terminal,
wherein the switch is configured to selectively couple the output terminal to one from among the parallel connection terminal and the third input terminal according to the switch control signal, and
wherein the battery management system is configured to control the first variable resistor and the second variable resistor according to the swelling data value and the state of charge to adjust a ratio between a charging or discharging current flowing into or out of the battery module and a charging or discharging current flowing into or out of the auxiliary battery module.

6. The battery pack of claim 5,
wherein an electrical load is coupled between the first terminal and the second terminal, and
wherein the battery management system is configured to discharge the battery module through the electrical load when the swelling data value is greater than or equal to a reference battery swelling value and the state of charge has reached the limit.

7. A method for operating a battery pack comprising a battery module, the method comprising:
sensing whether or not the battery module is swollen by a sensor to measure a battery swelling measurement value of the battery module;
monitoring a state of charge of the battery module;
determining whether a state of the battery module is a charging state or a discharging state;
when the state of the battery module is the charging state, determining whether or not the state of charge is greater than or equal to a charging limit;
when the state of the battery module is the discharging state, determining whether or not the state of charge is less than or equal to a discharging limit;
limiting the state of charge of the battery module to be within a range between the charging limit and the discharging limit to reduce a swelling rate of the battery module; and
when the battery module is sensed to be swollen, discharging the battery module when the state of charge is greater than or equal to the charging limit and charging the battery module when the state of charge is less than or equal to the discharging limit, repeatedly, to correct the swelling of the battery module, wherein the battery module is sensed to be swollen when the battery swelling measurement value is greater than or equal to a swelling reference value.

8. The method of claim 7, further comprising charging or discharging the battery module within a state of charge range, which is between the charging limit and the discharging limit.

9. The method of claim 7, wherein the limiting the state of charge of the battery module comprises:
when the battery module is swollen and the state of charge is greater than or equal to the charging limit or lesser than or equal to a discharging limit, disconnecting the battery module from an external device to stop the charging or the discharging of the battery module.

10. The method of claim 9, wherein the battery pack further comprises an auxiliary battery module, the method further comprising:
when the battery module is disconnected from the external device to stop the charging of the battery module, connecting the auxiliary battery module to the external device to start the charging of the auxiliary battery module; and
when the battery module is disconnected from the external device to stop the discharging of the battery module, connecting the auxiliary battery module to the external device to start the discharging of the auxiliary battery module.

11. The method of claim 7, wherein the battery pack further comprises the sensor to measure the battery swelling measurement value of the battery module, and an auxiliary battery module, the method further comprising:
measuring the battery swelling measurement value;
when the state of the battery module is the charging state, adjusting a ratio between a charging current provided to the battery module and a charging current provided to the auxiliary battery module according to the state of charge of the battery module and the battery swelling measurement value; and
when the state of the battery module is the discharging state, adjusting a ratio between a discharging current provided from the battery module and a discharging current provided from the auxiliary battery module according to the state of charge of the battery module and the battery swelling measurement value.

12. The method of claim 7, wherein the discharging and charging of the battery module, repeatedly, comprises:
when the state of the battery module is the charging state, begin discharging the battery module when the battery module is swollen and the state of charge is greater than or equal to the charging limit; and
when the state of the battery module is the discharging state, begin charging the battery module when the battery module is swollen and the state of charge is less than or equal to the discharging limit.

13. An idle stop and go system for a vehicle comprising:
a positive bus;
a negative bus;
a power generation module coupled between the positive bus and the negative bus;
a starter motor coupled between the positive bus and the negative bus;
an electrical load coupled between the positive bus and the negative bus;
a main controller configured to generate a main control signal; and
a battery pack comprising:
a first terminal coupled to the positive bus;
a second terminal coupled to the negative bus;
a battery module coupled between the first terminal and the second terminal and having a state of charge;
a sensor configured to measure a swelling of the battery module and to generate a swelling data value; and
a battery management system configured to receive the main control signal, to limit the state of charge of the battery module to be within a range between a charging limit and a discharging limit when the swelling data value is greater than or equal to a reference battery swelling value, and to control a charging and a discharging of the battery module repeatedly, when the swelling data value is greater than or equal to the reference battery swelling value and the state of charge has reached the charging limit or the discharging limit.

14. The idle stop and go system of claim 13, wherein the battery pack further comprises:
a selector coupled between the first terminal and the battery module, the selector comprising:
a plurality of input terminals;
an output terminal coupled to the first terminal; and
a switch configured to selectively couple the plurality of input terminals to the output terminal according to a switch control signal generated by the battery management system; and
an auxiliary battery module coupled between the selector and the second terminal,
wherein the plurality of input terminals comprises:
a first input terminal coupled to the battery module;
a second input terminal coupled to the auxiliary battery module; and
a third input terminal not coupled to either of the battery module or the auxiliary battery module, and
wherein the switch is configured to selectively couple the output terminal to at least one from among the first input terminal, the second input terminal, and the third input terminal according to the switch control signal.

15. The idle stop and go system of claim 14,
wherein the selector further comprises:
a first variable resistor coupled between the first input terminal and a parallel connection terminal; and
a second variable resistor coupled between the second input terminal and the parallel connection terminal, and
wherein the switch is configured to selectively couple the output terminal to one from among the parallel connection terminal and the third input terminal according to the switch control signal.

16. The idle stop and go system of claim 13,
wherein the battery management system is further configured to discharge the battery module through the electrical load when the swelling data value is greater than or equal to the reference battery swelling value and the state of charge has reached the limit.

* * * * *